United States Patent [19]
La Rue

[11] Patent Number: 5,282,309
[45] Date of Patent: Feb. 1, 1994

[54] APPARATUS FOR CONSTRUCTING AN UNBALANCED ROTOR

[75] Inventor: Larioux R. La Rue, Worden, Ill.

[73] Assignee: Emerson Electric Co., St. Louis, Mo.

[21] Appl. No.: 797,707

[22] Filed: Nov. 25, 1991

[51] Int. Cl.$^5$ ............................................. H02K 15/16
[52] U.S. Cl. ........................................ 29/736; 29/252; 29/520; 29/598
[58] Field of Search ............... 29/732, 598, 736, 252, 29/520, 407

[56] References Cited
U.S. PATENT DOCUMENTS
4,642,886  2/1987  Muck et al. ........................... 29/598

*Primary Examiner*—Carl E. Hall
*Attorney, Agent, or Firm*—Polster, Lieder, Woodruff & Lucchesi

[57] ABSTRACT

A rotor assembly (10, 20) for use in a dynamoelectric machine such as an electric motor has counterweights (18, 28) installed on it to reduce vibrations when the machine is in use. Apparatus (30) is for attaching a counterweight to each end of the assembly to reduce machine vibrations when in use. The apparatus comprises a support (32) on which the rotor assembly and counterweights are installed. The counterweights are installed in a predetermined relationship with the assembly so when they are attached, an unbalanced rotor assembly is produced. The rotor assembly is mounted in a predetermined position on the support. The support is indexed from a first station (S1) at which the rotor assembly and counterweights are installed on the support to a second station (S2) at which the counterweights are attached to the respective ends of the assembly. A press (36) is movable relative to the support, when it is at the second station, for pressing the rotor assembly and counterweights together and attach the counterweights to the respective ends of the assembly.

29 Claims, 3 Drawing Sheets

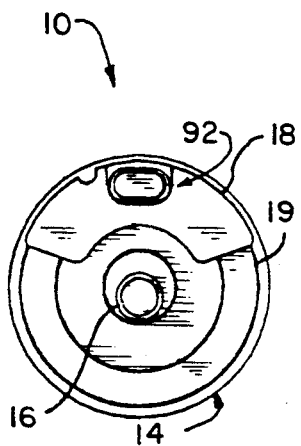
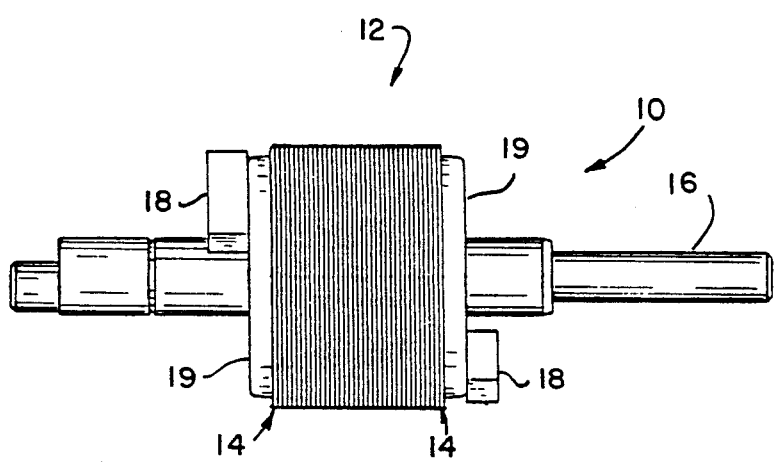
FIG. 1A.   FIG. 1B.
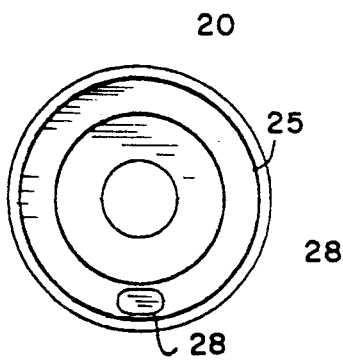
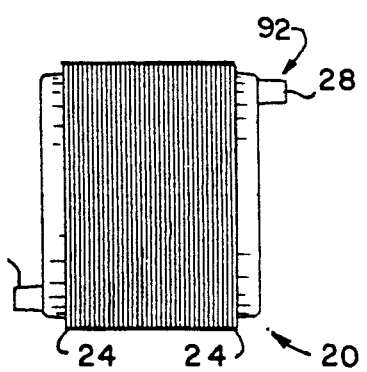
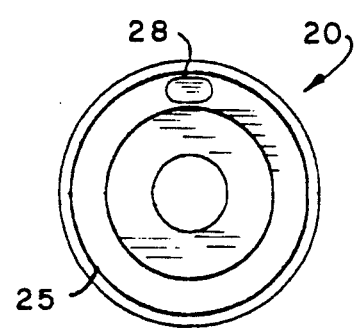
FIG. 2A.   FIG. 2B.   FIG. 2C.

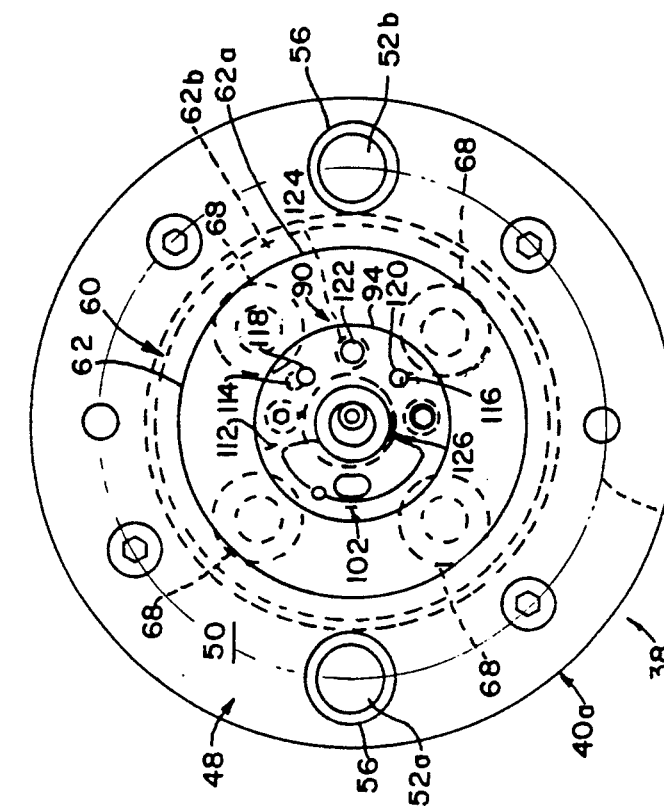
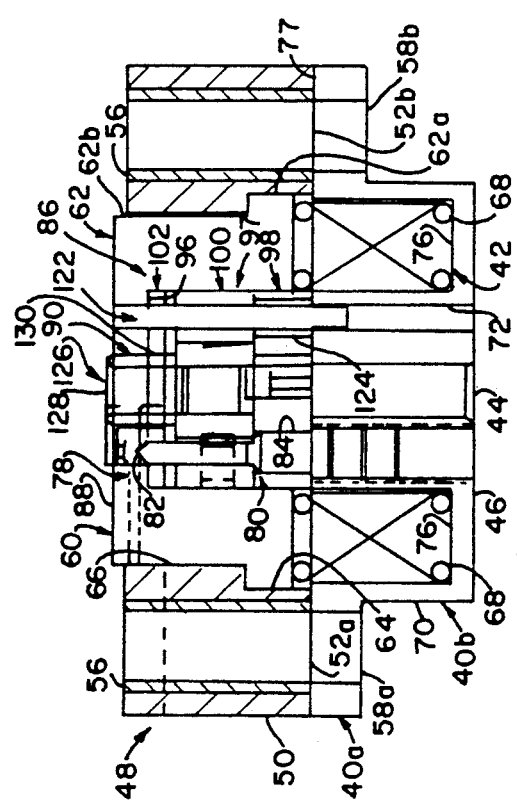
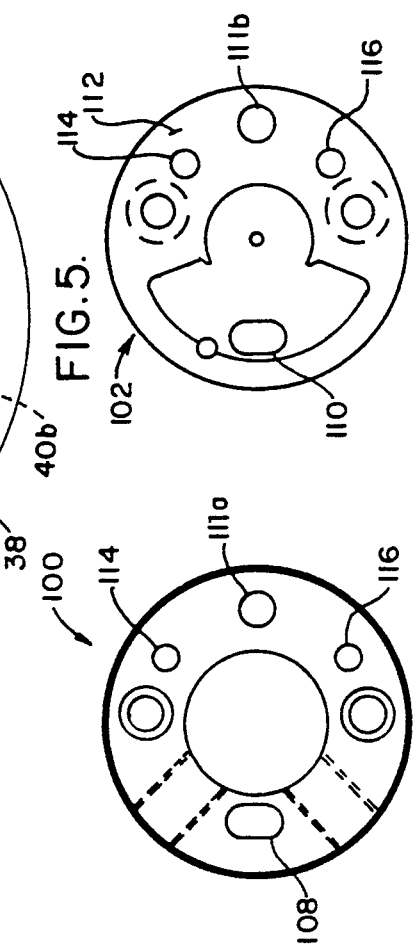
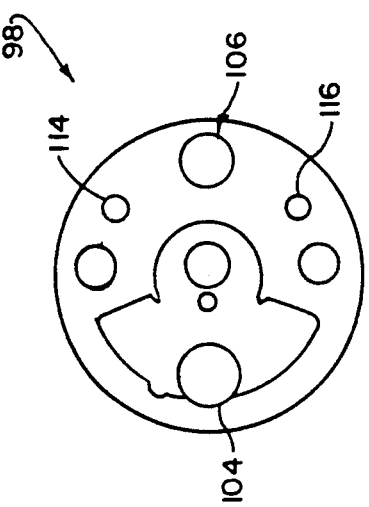

APPARATUS FOR CONSTRUCTING AN UNBALANCED ROTOR

BACKGROUND OF THE INVENTION

This invention relates to to dynamoelectric machines having unbalanced rotor assemblies and, more particularly, to a method and apparatus of constructing such a rotor assembly in a better and more economical manner than heretofore possible.

In certain electric motor applications, especially those in which air is pumped through a system to entrain an object in the airstream and move it from one place to another, damaging motor vibrations are often produced. One way of counteracting these vibrations is by applying counterweights to the the rotor assembly portion of the motor. Properly sized counterweights properly positioned will reduce, or eliminate the vibration problem. As a tradeoff, however, there is an increase in the manufactured cost of the motor. This is so, not only because of the added material in the motor, but also because of the time and labor required to attach counterweights to the assembly. Inclusion of counterweights in the motor of course means additional steps in the manufacturing process. Since precision of placement of the counterweights is vital in eliminating the vibration problem, care must be taken to insure the placement is correct. It will be appreciated that if counterweights are not correctly located, they may actually exacerbate the vibration problem, not solve it. What would be useful would be a way of readily incorporating the placement of counterweights as part of the rotor assembly, since this would help minimize any increased manufacturing costs. At the same time, if the accuracy of weight placement were insured, the effectiveness of the included weights could be assured, thus prolonging the useful life of the motor in these applications. In this latter regard, it would also be helpful if the resultant rotor assembly were an unbalanced assembly. This is important because an unbalanced assembly is more effective in eliminating the effects of vibrations in the above referenced motor applications.

SUMMARY OF THE INVENTION

Among the several objects of the present invention may be noted the provision of a method and apparatus for attaching counterweights to a rotor assembly for a dynamoelectric machine such as an electric motor thereby to counteract vibrations to which the motor is subjected when in use; the provision of such method and apparatus to permit automated attachment of the counterweights; the provision of such method and apparatus by which the counterweights are precisely and permanently located on the rotor assembly; the provision of such method and apparatus by which a plurality of counterweights can be attached to the rotor assembly simultaneously; the provision of such method and apparatus by which counterweights located at opposite ends of the rotor assembly can be simultaneously attached to it; the provision of such method and apparatus in which the counterweights are attached so as to produce an unbalanced rotor assembly; the provision of such method and apparatus by which various sizes and shapes of weights can be attached to the rotor assembly; the provision of such method and apparatus in which one rotor assembly can be loaded onto the apparatus for weight attachment simultaneously with a second rotor assembly having its counterweights attached; and, the provision of such method and apparatus to provide a high manufacturing rate, be readily incorporated in an automated manufacturing process for fabricating a motor, and to have a minimal cost impact on the manufacturing cost for a motor.

In accordance with the invention, generally stated, a rotor assembly installed in a dynamoelectric machine has counterweights attached to it to reduce machine vibrations when in use. An apparatus for attaching a counterweight to each end of the assembly comprises a support on which the rotor assembly and counterweights are installable. The counterweights are installed on the support with the rotor assembly and in a predetermined relationship therewith. The rotor assembly is oriented in a predetermined position on the support. The support is indexed from a first station at which the rotor assembly and counterweights are installed on the support to a second station at which the counterweights are attached to the respective ends of the assembly. A press is movable relative to the support when it is at the second station to press the rotor assembly and counterweights together thereby to attach the counterweights to the respective ends of the assembly, the weights being attached so as to produce an unbalanced assembly. A method of attaching counterweights to a rotor assembly is also disclosed. Other objects and features will be in part apparent and in part pointed out hereinafter.

BRIEF DESCRIPTION OF THE DRAWINGS

FIGS. 1A and 1B are respective end and side elevational views of a rotor assembly with counterweights located at each end of the assembly;

FIGS. 2A-2C are respective end, side, and opposite end elevational views of a second rotor assembly to which counterweights are attached to each end of the assembly;

FIG. 4 is a sectional view of a rotor assembly support of the apparatus;

FIG. 5 is a top plan view of the support indicating how the rotor is aligned with respect to the support to produce an unbalanced rotor assembly; and FIGS. 6A-6C are plan views of locator rings installed on the support.

Corresponding reference characters indicate corresponding parts throughout the drawings.

DESCRIPTION OF A PREFERRED EMBODIMENT

Figure 3:
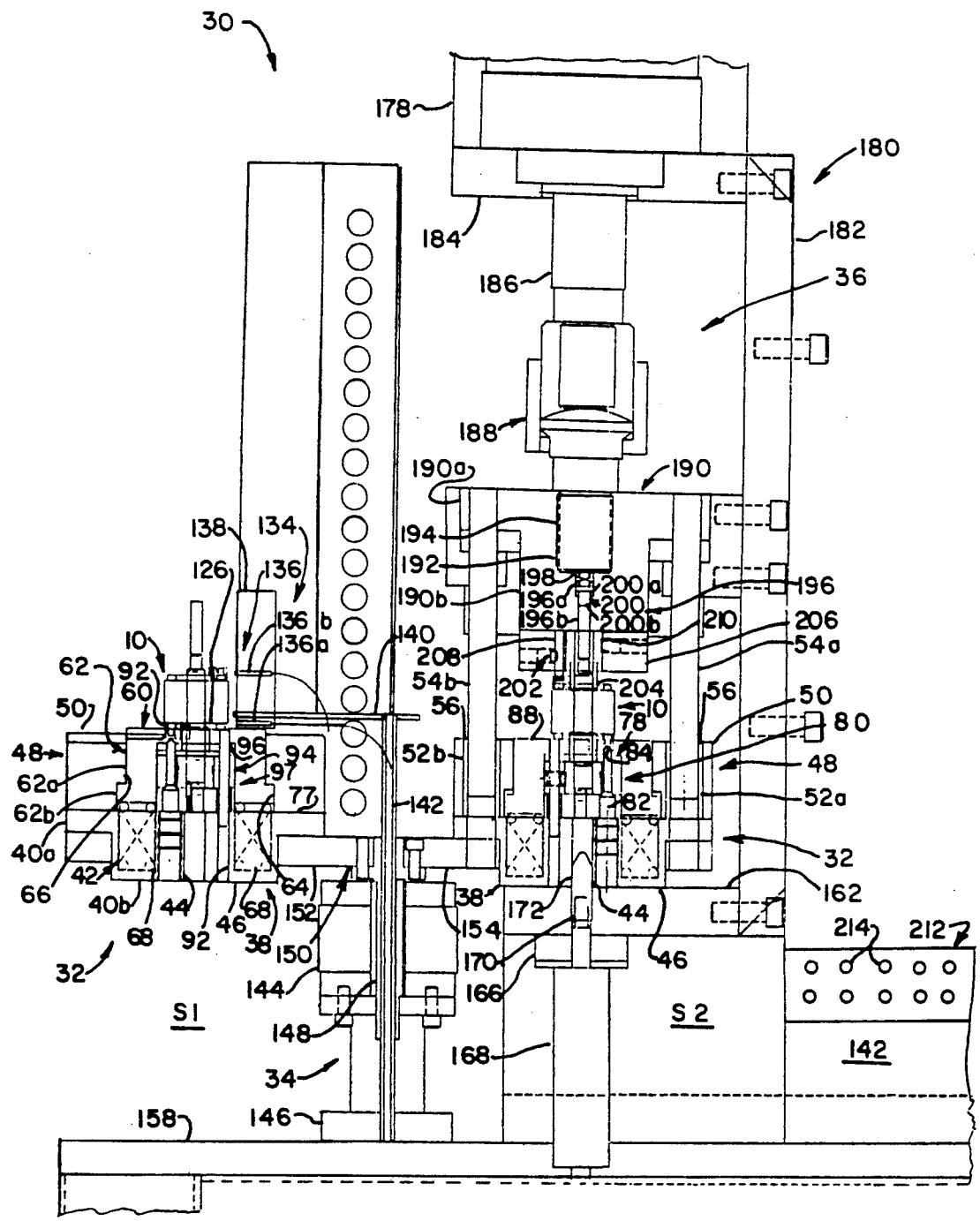
FIG. 3 is an elevational view, partly in section, of apparatus of the present invention for attaching counterweights to a rotor assembly.

Referring to the FIGS. 1A and 1B, a rotor assembly 10 for installation in a dynamoelectric machine such as an electric motor (not shown) comprises a stack 12 of laminations 14. The manufacture of rotor laminations is known in the art and is not described. It will be understood, however, that each lamination 14 has a central opening therein for the stack of laminations to be installed on a shaft 16 by which the rotor assembly is rotated within the motor. After completion of assembly 10, it is assembled with other components (not shown) to complete the motor. It is known that for certain motor applications, vibrations are created which can damage the motor so that it loses its efficiency, or breaks down altogether. To prevent these vibrations, counterweights 18 are installed at opposite ends of assembly 10. The stack of rotor laminations has an end ring 19 at each end and one of the counterweights is conveniently attached to these respective end rings. As shown in the drawings, two counterweights are used with assembly 10, although additional counterweights may be employed. Further, the counterweights are mounted 180 degrees apart from each other at the opposite ends of the rotor assembly. Again, the degree of offset between the counterweights could be varied depending upon the motor's application. Also, and as described hereinafter, the counterweights are attached so as to produce an unbalanced assembly.

The rotor assembly 20 is illustrated in FIGS. 2A-2C. Assembly 20 is the die cast core that, in the manufacturing process, preceeds assembly 10. Assembly 10 includes a stack of rotor laminations 24 with an end ring 20 at each end of the stack. A projection 28 is die cast integral with the die cast end rings 25. It will be see that the 180 degree offset between the projections is maintained as the die cast operation. These projections 28 provide a means for attaching the counterweights 18. The counterweights 18 are crescent shaped arcuate segments being attached to the rotor core (see FIG. 2B) via the staking of the projections 28 during the staking operation such as described hereinafter.

The attachment of the counterweights to the rotor assembly is accomplished during manufacture of the rotor assembly prior to its installation in the motor. In performing this attachment operation, there are a number of factors which are involved. First, in order to maintain volume production of motors, the attachment operation should be automated as much as possible. Next, during the assembly process, it is important that the placement of the counterweights be as accurate as possible so that the weights perform their intended function when the motor is in use. Finally, the attachment should be accomplished in such a way as to not damage the rotor assembly; since doing so will also lead to motor failure.

Referring to FIG. 3, apparatus of the present invention for attaching a counterweight to each end of a rotor assembly, to reduce motor vibrations when the motor is in use, is indicated generally 30. Although the apparatus is described in more detail hereinafter, the apparatus includes a support means 32 on which a rotor assembly 20 and its associated counterweights 18 and shaft 16, are installed. The rotor assembly is installed in a predetermined position on the support means. The counterweights, likewise, are installed on the support means in a predetermined relationship with the rotor assembly. An indexing means 34 rotates support means 32 from a first station S1, at which the rotor assembly and counterweights are installed on the support means, to a second station S2 at which the counterweights are attached to the respective ends of the assembly. For this purpose, apparatus 30 includes a press means 36 which is movable relative to support means 32, when the support means is resident at the second station. The press means presses, or squeezes, the laminations, end plates, and counterweights together. This staking operation serves to attach the counterweights to the respective ends of the rotor assembly and the rotor core assembly to the shaft. Once the pressing operation is complete, the index means returns the support means back to the first station where the rotor assembly with attached counterweights is removed and the next assembly and its associated counterweights are loaded onto the support means.

The apparatus is designed for easy integration into an existing manufacturing line, or it can be used as a stand alone set-up. The components can therefore be mounted on a table or other platform, or they can be mounted in a suitable fixture. In an automated assembly line configuration, the apparatus is oriented so that the rotor stack-/rotor shaft/counterweights are automatically loaded onto the support means at the start of a cycle and the completed assembly automatically removed from the support means at completion of the cycle. Alternately, in either set-up, the components can be manually loaded onto the support means and the completed assembly manually removed.

Referring to FIGS. 4 and 5, support means 32 is shown to comprises a base plate 38 having an outer section 40a and an inner section 40b. The base plate has an inverted "hat" shape with section 40b having a central, circular recess 42. Section 40a comprise a flat rim extending circumferentially about section 40b at the upper end of the recess. A central, circular opening 44 is formed in the bottom wall 46 of the recess.

A guide means 48 is carried by the support means and is for guiding movement of press means 36 during attachment of the counterweights to the rotor assembly. The guide means includes an annular ring 50 seated atop section 40a of the base plate, the width of the ring generally corresponding to the width of section 40a. Ring 50 has diametrically opposed longitudinally extending bores 52a, 52b. As seen in FIG. 3, press means 36 includes a pair of spaced guide rods 54a, 54b sized to be received in the bores when the press means is operated. Bushings 56 are fitted in each bore. Further, section 40a of the support means has openings 58a, 58b corresponding in location and size to the bores. Thus, the rods will not bottom out on the rim when the press means is lowered.

The support means next includes pad means 60 carried by the support means. Means 60 comprises a pressure pad 62 capable of withstanding the pressure exerted by the press means on a rotor assembly installed on the support. The pressure pad is a circular pad having a lower section 62a of a first diameter, and an upper section 62b of a second and smaller diameter. The diameter of section 62b corresponds to the inner diameter of ring 50. The ring has a circumferential groove 64 formed about the base of the inner wall of 66 of the ring, thus forming an undercut in the ring. Groove 64 has height greater than the height of pad section 62a. The diameter of pad section 62a corresponds to the inner diameter of the ring and the groove. Consequently, when the support means is being assembled, pressure pad 62 is set in place on the base plate first, and ring 50 is thereafter set down over it.

Support means 32 next includes a plurality (four) of springs 68 installed in recess 42 of base plate section 40b. Recess 42 is defined by bottom wall 46 and a circular outer wall 70 of section 40b. The recess also has an inner wall 72. Walls 70 and 72 define channels 74 in which each of the springs 68 are located. The lower end of the each spring seats against a bottom wall 76 of the recess, while the height of the spring is such that its upper end extends above the upper surface 77 of the base plate. Pressure pad 62 rests upon the upper end of the springs. When the support means is at station S1, and no rotor assembly is carried by the support means, the springs urge the pressure pad upward, as shown in FIG. 4, with the upper face of pad section 62a bearing against the sidewall of groove 64 in ring 50.

For attaching a counterweight to the end of the rotor assembly resting on pressure pad 62, apparatus 10 further includes staking means 78. Means 78 first includes a stake punch 80 having a punch end 82, and a base 84. The base of the stake punch is round, its intermediate portion is generally oval, and its upper end is pointed. The support means includes means 86 for locating stake punch 80 relative to the location of a counterweight, when the rotor assembly and counterweight are installed on the support means. When properly positioned, the stake punch is aligned parallel to the longitudinal axis of the rotor assembly. Pressure pad 62 has an upper surface 88 in which a central opening 90 is formed. A lug portion 92 of an end ring 19, 25 of a rotor assembly is received in this opening. Opening 90 comprises a bore 94 in pad 62 and extending longitudinally of it. At the upper end of the pad the bore has a first diameter; at the lower end thereof, the bore has a second and larger diameter. A shoulder 96 is formed by the junction between the two sections of the bore.

For properly positioning the stake punch, means 68 includes a stack 97 of locator rings, positioned in the lower section of bore 94, is used. The apparatus includes three such locator rings, 98, 100, and 102 respectively. Referring to FIG. 6A, ring 98 is shown to have a pair of diametrically spaced circular openings 104, 106 respectively. Opening 104 is sized to receive base 84 of the stake punch. Referring to FIG. 6B, ring 100 is shown to have an oval opening 108 through which the middle portion of the punch extends. In FIG. 6C, ring 102 is shown to have an oval opening 110 through the upper staking end of the punch extends. Rings 100, 102 also have opposed openings 111a, 111b respectively opposite their openings 108, 110.

The locator rings are arranged in the stacked configuration within the bore of pressure pad 62. As seen in FIG. 4, ring 98 is on the bottom of the stack, ring 100 in the middle, and ring 102 on the top. Each ring has a diameter corresponding to the diameter of the lower section of bore 94. The stack of locator rings is installed prior to installation of the pressure pad. When the pad is installed, shoulder 96 bears against the upper surface 112 of ring 102. All three locator rings 98-102 have corresponding openings 114 and 116 on opposite sides of the centerline of the rings. Respective dowels 118, 120 are inserted through these openings to form the ring stack. Locator rings 100 and 102 have respective openings 118, 120 diametrically opposite openings 108, 110. When the rings are stacked, openings 106, 118, and 120 are aligned. A guide pin 122 fits through these openings as shown in FIG. 4. Opening 106 is slightly larger in diameter than the other two openings for pin 122. This is because a bushing 124 is fitted into opening 106.

In addition to stake punch 80, apparatus 10 includes a second stake punch 126 which is used to stake in place the rotor assembly about the rotor shaft 16 that is inside the assembly. Punch 126, unlike punch 80 is annular in shape and has a punch end 128, which extends above the upper surface of pressure pad 62, and a base 130, which sits upon the upper surface 132 of locator ring 102. End 128 of punch 126 has an inner diameter which is slightly larger than then the diameter of a rotor shaft. Thus, when a rotor assembly is loaded onto support means 32, the rotor shaft fits into the central bore of the punch. Further, as shown in FIG. 5, it will be seen that stake punch 126 is not axially aligned with the longitudinal axis of the support means. Rather, it is installed off-center. This, in turn, means that when a staking operation is performed, the counterweights will be attached so that the completed rotor assembly is an unbalanced assembly. This is important because the imbalance is further effective in reducing or eliminating motor vibrations.

As shown in FIG. 3, apparatus 10 has two work stations. The apparatus includes a sensing means 134, located at station S1, for determining whether or not a rotor assembly has been loaded onto the support means. Means 134 comprises optical sensors 136 means positioned adjacent support means 32. The optical sensors are mounted in a frame 138 which is attached to an arm 140 extending radially outwardly from a shaft 142 about which the support means is rotated from one station to the other. One sensor is 136a is mounted in frame 138 so to be adjacent the top surface of pressure pad 62. A second sensor 136b is mounted in frame vertically above sensor 136a. The distance between the two sensors is such that, if a rotor assembly is placed on the support means, sensor 136a will detect the lower end of the rotor stack 12, and sensor 136b the upper end of the stack. Both sensors are connected to a control means 142 which controls operation of apparatus 10. In operation, when a rotor assembly is properly installed on the support means, its presence is detected by both sensors. At that time, the control means energizes indexing means 34 to move the support means to station S2. If only one of the sensors detect the presence of the assembly, the control means is inhibited from moving the support means. It will be understood that sensing means 134 can be effected using other than optical sensors.

Indexing means 34 includes a hydraulic indexer 144 operated by control means 142. The control means turns the indexer "on" to move the support means from one station to the other, and turns the indexer "off" while the support means is dwelling at that station. The hydraulic indexer 144 is vertically mounted on a support base 146. The indexer has a hollow shaft 148 extending through its upper end. A plate 150 is secured to the outer end of the shaft. The plate has a radially extending arm 152 to which base plate 38 is attached. As shown in FIG. 3, apparatus 10 includes a circular support plate means 32. Support means 32 includes two base plate 38 assemblies and each can simultaneously support a rotor assembly. This support means also has a second plate 38, this second base plate being attached to a radially extending arm 154. Arm 154 is diametrically opposed to arm 152 for one support means 32 to be at station S1 simultaneously with the other support means dwelling at station S2. Thus, a rotor assembly is loaded into one support means while a rotor assembly in the other support means is having its counterweights attached by press means 38. Alternatively, the apparatus includes only one support means 32. While the attachment rate in this latter embodiment is only one-half that of the former, either embodiment of the apparatus is effective to attach counterweights to a rotor assembly. The support shaft 142 extends upwardly through hydraulic indexer shaft 148. The support shaft has a height slightly greater than the elevation of the upper surface of pressure pad 62 above a table top 158 on which the indexing means is positioned. At the top of the support shaft arm 140 extends radially outwardly toward station S1. As noted, frame 138 for the optical sensors is mounted on the outer end of arm 140.

As the control means moves the support means and the rotor assembly installed on it to station S2, the bottom surface of base plate 38 is positioned over a table top 162 which acts as a support for the base plate. Table top 162 is a predetermined height above table top 158, that height corresponding to the height of bottom surface 46 of base plate 38 above table top 158. A bracket 166 extends beneath table top 162, and a hydraulic cylinder 168 is supported by the bracket. A vertical bore 170 is formed in table top 162 at a point immediately below the longitudinal axis of bore 94 in pressure pad 62. A locking pin 172 attached to hydraulic cylinder 168 is movable upwardly through bore 170 when hydraulic cylinder 168 is energized by the control means. Pin 172 is received in opening 44 in the bottom of the base plate. Now so long as hydraulic cylinder 168 is pressurized with the rod extended, the locking pin holds support means 32 in place at station S2. Only when the hydraulic cylinder is pressurized with the rod retracted and the pin retracted, can the support means be returned to station S1.

Press means 36 includes a hydraulic cylinder 178 operated by control means 142. This cylinder is mounted in a frame assembly 180 comprising a vertical support 182 extending upwardly from table top 162, and a horizontal arm 184 extending outwardly from the upper end of the support. Hydraulic cylinder 178 is positioned directly above the support means at station S2. A vertically depending cylinder rod 186 of the hydraulic cylinder is connected to a ram assembly 188. Ram 188, in turn, is threadably attached to a press head 190. Press head 190 acts on the upper end of the rotor assembly installed on support means 32. The press head is circular in form and has an upper section 190a of a first diameter, and a lower section 190b of a second and smaller diameter. A central threaded bore 192 is formed in the press head to receive a threaded connecting shaft 194 of rams 188. Bore 192 extends into the lower section of the press head. A second central bore 196 extends from the lower end of bore 192 to the lower end of the press head. This bore is smaller in diameter than bore 192. Bore 196 has an upper section 196a and a lower section 196b. The diameter of the lower section of the bore corresponds to that of a rotor shaft, while that of the upper section is slightly larger. A spring 198 is positioned in bore section 196a. The upper end of the spring seats against the lower end of shaft 194. The lower end of the spring bears against a seat 200. Seat 200 has a flange portion 200a residing in bore 196a, and a shaft portion 200b extending into bore section 196b. When the press head is lowered, the upper end of the rotor shaft is enclosed in bore section 196b. Depending upon the length of the shaft, its upper end may contact seat 200 and compress it against the force of spring 198.

As previously described, press means 36 includes guide rods 54a, 54b. The upper ends of these rods are mounted in section 190a of the press head. The lower end of the rods are received in openings 52a, 52b of support means ring 50. The guide rods insure that the press head travels in a prescribed vertical path so that the compressive force produced by the press means is delivered properly to the rotor assembly.

It will be understood, particularly with reference to FIGS. 1A-2C, that counterweights are attached to each end of a rotor stack. Consequently, when the rotor assembly and its associated counterweights are installed on support means 32, a counterweight is located at the upper end of the assembly. This second counterweight is attached to the rotor assembly during the same staking operation in which the counterweight installed against pressure pad 62 is attached In addition, since as previously discussed, the first counterweight is attached so as to produce an unbalanced assembly, so is the second counterweight. To achieve this, a second set of stake punches are installed in the press head. One stake punch 202 is similar in size and shape to stake punch 80, and a second stake punch 204 is similar in size and shape to stake punch 126. Accordingly, stake punch 202 is mounted in a block 206 secured to the lower end of the press head. A vertically extending bore 208 is aligned parallel to the longitudinal axis of the press head and punch 202 is installed in this bore. As installed, punch 202 bears against a lug of the upper end ring of the rotor stack. A vertical bore 210 is formed in the block in alignment with bore 196 of the press head. Bore 210 is larger in diameter than bore 196 to accommodate punch 204. As with punch 126, punch 204 acts against the portion of the end rotor lamination adjacent the rotor shaft bore through the rotor stack.

In operation, a rotor assembly, including the lamination stack 12, rotor shaft, and counterweights are loaded onto support means 32 of the apparatus at station S1. The purpose of the apparatus is to secure or attach the counterweights to the end rings and the rotor stack to the shaft. The rotor assembly is installed in an off-center position on the support means so that an unbalanced rotor assembly will be formed.

The optical sensors 136a, 136b sense when the rotor assembly components are in place. They provide an appropriate indication to control means 142. The control means then starts indexer 144 which rotates the support means and rotor assembly components from station S1 to station S2. Once at station S2, the control means stops indexer 144 and activates hydraulic cylinder 168 to extend locking pin 172 into opening 44 of the support means base plate. The support means is now captured in place. Next, the control means activates hydraulic cylinder 178 to lower press head 190. As the press head comes down, guide rods 54a, 54b are inserted into openings 52a, 52b of ring 50. This insures that the press head travels along the correct path. Further, the upper end of the rotor shaft is received into bore 210 and then bore 196 of the press head. Finally, the stake punches 202 and 204 contact their respective portions of the rotor assembly and begin to compress the assembly. As the downward movement of the press head continues, the appropriate portions of the rotor assembly are pressed against the corresponding stake punches 80 and 126 mounted on the support means 32. As the press head continues to move, a staking operation takes place in which the stake punches effectively squeeze the rotor assembly components together.

When this operation is complete, the control means reverses hydraulic cylinder 178 to withdraw the press head upwardly. Once the press head has returned to its starting position, hydraulic cylinder 168 is reversed and pin 172 is withdrawn from the support means. After this is done, indexer 144 is again activated to rotate the support means from station S2 to station S1.

What has been described is an apparatus and method for assembling an unbalanced rotor for use in certain motor applications. Within the scope of the invention as set forth above, there are a number of variations. For example, the apparatus, as noted, can be a stand alone unit in which rotor parts are manually loaded onto the apparatus. Or, the apparatus can be part of an automated assembly process in which components are automatically loaded onto the apparatus and a completed assembly removed. In addition, the apparatus can have one support means or two. If one is used, then the loading and pressing operations are performed sequentially. If the apparatus has two support means, these operations can be performed simultaneously. Further, the control means can either be manual or automatic. If manual, an operator may have a display panel 212 with various lamp displays 214 indicating the operational status of the apparatus. If automated, the control may be preprogrammed to automatically sequence from one operation to another based upon a received input such as that from the optical sensors. Regardless of the different variations noted, the apparatus produces completed rotor assemblies in an efficient, cost effective manner, and is capable of use in a wide variety of manufacturing settings.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Apparatus for attaching a counterweight to each of a rotor assembly used in an electric motor, the rotor assembly having counterweights attached thereto to reduce vibrations when the motor is in use, said apparatus support means on which the rotor assembly and counterweights are installed, the counterweights being installed in a predetermined relationship with the assembly;

index means for moving the support means from a first station at which the rotor assembly and counterweights are installed on the support means to a second station at which the counterweights are attached to the respective ends of the assembly; and, press means movable relative to the support means, when it is at the second station, for pressing the rotor assembly and counterweights together thereby to attach the counterweights to the respective ends of the assembly, the counterweights being attached so that the resultant rotor assembly is unbalanced.

2. The apparatus of claim 1 further including guide means carried by the support means for guiding movement of the press means.

3. The apparatus of claim 2 further including pad means carried by the support means and capable of withstanding the pressure exerted on the rotor assembly by the press means when the press means is activated.

4. The apparatus of claim 3 wherein the support means includes a base plate and the guide means comprises an annular ring seated thereon.

5. The apparatus of claim 4 wherein the press means comprises a plurality of guide posts and the guide means includes openings in the ring in which the posts are received during operation of the press means.

6. The apparatus of claim 5 wherein the support means further includes spring means installed in the base plate, and the pad means comprises a pressure pad supported by the spring means.

7. The apparatus of claim 1 further including staking means for staking the counterweight to the rotor assembly by operation of the press means.

8. The apparatus of claim 7 wherein the staking means includes a stake punch and means for locating the stake punch relative the location of the counterweight when the rotor assembly and counterweight are installed on the support means.

9. The apparatus of claim 8 wherein the locating means aligns the stake punch parallel to the longitudinal axis of the rotor assembly.

10. The apparatus of claim 9 further including pad means comprising a pressure pad having an upper surface in which an opening is formed and in which a lug portion of an end ring of the rotor assembly is received, and a lower surface in which a recess is formed, the locating means comprising a plurality of locator rings positioned in the recess.

11. The apparatus of claim 10 in which the stake punch has a base end and a punch end, the base end of the punch being receivable in an opening in one of the locator rings and extending through an opening in another locator ring, the openings being aligned for orienting the stake punch, and the punch end of the stake punch being received in the same opening in which the lug is received.

12. The apparatus of claim 11 wherein the pressure pad has a central longitudinal opening extending therethrough and the staking means includes a second stake punch receivable in the opening for performing a staking operation on the rotor assembly adjacent the rotor shaft, said second stake punch being non-axially aligned with pressure pad so when a rotor assembly is installed on the support means it is off-center with respect to the longitudinal axis thereof, whereby subsequent attachment of the counterweights by the press means produces an unbalanced rotor assembly.

13. The apparatus of claim 12 wherein the second stake punch has a punch end and a base, the base resting on one of the locator rings and the height of the second stake punch being such that the punch end thereof extends beyond the upper surface of the pressure pad.

14. The apparatus of claim 4 wherein the indexing means includes a longitudinal shaft extending parallel to a longitudinal axis of the rotor assembly when installed on the support means, a swing arm one end of which fits about the shaft and the other end of which is attached to the support means, and a motor and drive means connected to the first said end of the swing arm for rotating the swing arm about the shaft to move the support means from one station to the other.

15. The apparatus of claim 13 wherein one end of the rotor assembly and a counterweight are installed on the pressure pad and the press means includes a press head and means for driving the press head against the opposite end of the rotor assembly to squeeze the rotor assembly against the pressure pad.

16. The apparatus of claim 15 wherein the rotor assembly includes a second counterweight attachable to said opposite end of the rotor assembly and the apparatus includes a set of staking means including first staking means carried on the support means for staking the one counterweight to the one end of the rotor assembly and second staking means mounted in the press head for staking the second counterweight to the other end of the rotor assembly.

17. The apparatus of claim 16 wherein the stakes means are so positioned that the counterweights are staked on the respective ends of the rotor assembly 180 degrees apart from each other.

18. The apparatus of claim 16 wherein the press means further includes means for accommodating a rotor shaft during operation of the press means.

19. The apparatus of claim 1 further including control means for activating the index means to move the support means from the first to the second station, and then the press means when the support means reaches the second station.

20. The apparatus of claim 19 wherein the control means further includes optical sensing means located at the first station for sensing when a rotor assembly is installed on the support means, the control means being inhibited from moving the support means unless a rotor assembly is in place thereon.

21. The apparatus of claim 15 further including table means for supporting the press means at the second station.

22. The apparatus of claim 21 wherein the table means comprises rest means on which the base plate is supported at the second station.

23. The apparatus of claim 22 further including means for locking the support means in place at the second station.

24. The apparatus of claim 23 wherein the locking means comprises a locking pin positioned at the second station and movable from a first position beneath the rest means to a second position thereabove when the support means is at the second station, and the support means includes a receptacle in the base plate for the pin to lock the base plate when the locking pin is moved to its second position.

25. Apparatus for attaching a counterweight to each end of a rotor assembly used in an electric motor, the rotor assembly having counterweights attached thereto to reduce vibrations when the motor is in use, comprising:

support means on which the rotor assembly, its associated rotor shaft, and the counterweights are installed, the counterweights being positioned at the opposite ends of the rotor assembly 180 degrees apart from each other;

index means for moving the support means from a first station at which the rotor assembly and counterweights are installed on the support means to a second station at which the counterweights are attached to the respective ends of the assembly;

press means movable relative to the support means, when it is at the second station, for exerting pressure on the rotor assembly and the counterweights; and, a set of staking means including first staking means carried on the support means and second staking means carried on the press means, the respective staking means acting on the counterweights at their respective ends of the rotor assembly to attach the counterweights to the respective ends of the assembly.

26. The apparatus of claim 25 further including control means for activating the index means to move the support means from the first to the second station, and then activating the press means when the support means reaches the second station.

27. The apparatus of claim 26 wherein the control means further includes optical sensing means located at the first station for sensing when a rotor assembly is installed on the support means, the control means being inhibited from moving the support means unless a rotor assembly is in place thereon.

28. The apparatus of claim 27 further including guide means carried by the support means for guiding movement of the press means.

29. The apparatus of claim 28 further including means for locking the support means in place at the second station.

* * * * *